United States Patent
Azagury et al.

(10) Patent No.: US 6,173,294 B1
(45) Date of Patent: Jan. 9, 2001

(54) METHOD FOR COMBINING CARD MARKING WITH REMEMBERED SET FOR GENERATIONAL GARBAGE COLLECTION WITH MORE THAN TWO GENERATIONS

(75) Inventors: Alain Azagury, Nesher; Elliot K. Kolodner, Haifa; Erez Petrank, Haifa; Zvi Yehudai, Haifa, all of (IL)

(73) Assignee: International Business Machines Corporation, Armonk, NY (US)

( * ) Notice: Under 35 U.S.C. 154(b), the term of this patent shall be extended for 0 days.

(21) Appl. No.: 09/139,752

(22) Filed: Aug. 25, 1998

(51) Int. Cl.[7] .................................................. G06F 17/30
(52) U.S. Cl. ............................................................ 707/206
(58) Field of Search ..................... 707/206; 711/170–173

(56) References Cited

U.S. PATENT DOCUMENTS

| | | | |
|---|---|---|---|
| 5,903,900 | * | 5/1999 | Knippel et al. ....................... 707/206 |
| 6,038,572 | * | 3/2000 | Schwartz et al. ..................... 707/206 |

OTHER PUBLICATIONS

Hudson et al., "A Language–Independant Garbage Collector Toolkit," COINS Technical Report 91–47, Sep. 1991.*
R.E. Jones and R.D. Lins. Garbage Collection: Algorithms for Automatic Dynamic Memory Management. Chapter 7 John Wiley & Sons (1996).
Holzle, U., "A Fast Write Barrier for Generational Garbage Collectors," OOPSLA/ECOOP '93, Workshop on Garbage Collections in Object–Oriented Systems, Oct. 1993.*
Hosking, A.L., et al., "Remembered Sets Can Also Play Cards," OOPSLA '93, Workshop on Garbage Collection and Memory Management, Washington D.C., Sep. 1993.*
Hudson, R.L., et al., "Incremental Collection of Mature Objects," Proceedings on International Workshop on Memory Management, vol. 637 of Lecture Notes in Computer Science, Springer–Verlag, 1992.*
Lieberman, H., et al., "A Real–Time Garbage Collector Based on the Lifetimes of Objects," Communications of the ACM, 26–6:419–429 (1983).*
Seligmann, J., et al., "Incremental Mature Garbage Collection Using the Train Algorithm," Proceedings of 1995 European Conference on Object–Oriented Programming, Lecture Notes in Computer–Science, Springer–Verlag Aug. 1995.*
Sobalvarro, P.G., "A Lifetime–based Garbage Collector for LISP Systems on General–Purpose Computers," Technical Report AITR–1417, MIT, AI Lab, Feb. 1988.*
Ungar, D., "Generation Scavenging: A Non–disruptive High Performance Storage Reclamation Algorithm," Proceedings of the ACM Symposium on Practical Software Development Environments, ACM SIGPLAN Notices 19–5:157–167 (1984).*
Wilson, P.R., "Uniprocessor Garbage Collection Techniques," Proceedings of International Workshop on Memory Management, vol. 637 of Lecture Notes in Computer Science, Springer–Verlag, 1992.*
Wilson, P.R., "A 'Card–Marking' Scheme for Controlling Intergenerational References in Generation–Based Garbage Collection on Stock Hardware," ACM SIGPLAN Notices, 24–5:87–92 (1989).*

* cited by examiner

Primary Examiner—Paul V. Kulik
(74) Attorney, Agent, or Firm—Browdy and Neimark

(57) ABSTRACT

A system for garbage collection of memory objects in a memory heap. The system includes a memory heap that is partitioned into few generations, each generation being partitioned into cards. The generations are associated with remembered sets and card markings data structure. Each card in the card markings data structure includes scan generation related data that represent generations for which the card has or has not to be scanned. The system further includes a processor communicating with the memory for scanning the cards according to the scan generation related data, and in response to identifying updated inter-generational pointers, the processor is capable of updating the remember set with the identified inter-generational pointers. The processor is further capable of updating the scan generation related data.

18 Claims, 3 Drawing Sheets

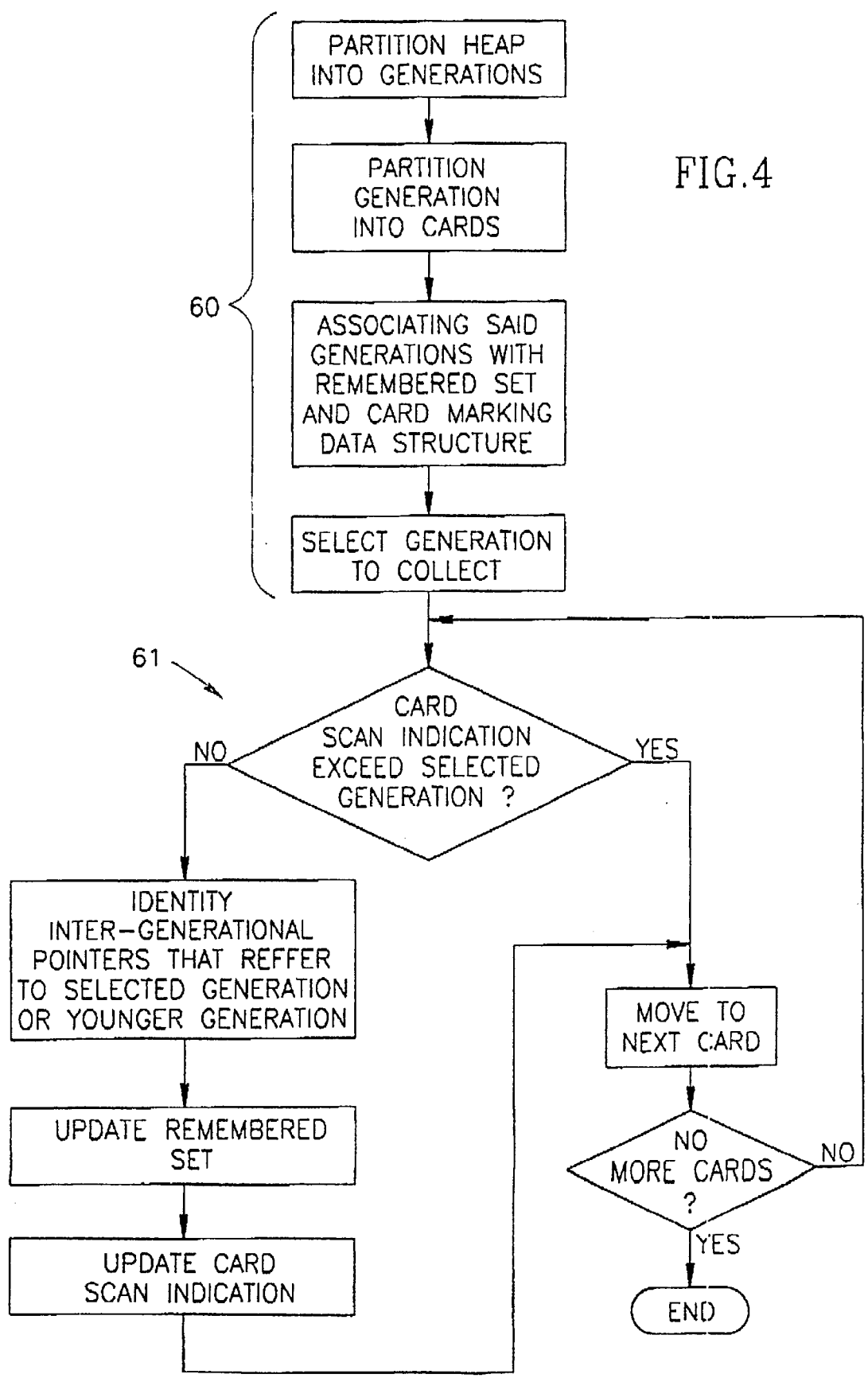

METHOD FOR COMBINING CARD MARKING WITH REMEMBERED SET FOR GENERATIONAL GARBAGE COLLECTION WITH MORE THAN TWO GENERATIONS

FIELD OF THE INVENTION

The present invention is in the general field of memory management and concerns more specifically garbage collected (GC) computer language and systems.

LIST OF PRIOR ART

In the description below, reference is occasionally made to the following publications:

REFERENCES

[1] R. E. Jones and R. D. Lins. Garbage Collection: Algorithms for Automatic Dynamic Memory Management. John Wiley & Sons, July 1996.

[2] U. Hölzle. A fast write barrier for generational garbage collectors. In Eliot Moss, Paul R. Wilson, and Benjamin Zorn, editors, *OOPSLA/ECOOP '93 Workshop on Garbage Collections in Object-Oriented Systems*, October 1993

[3] A. L. Hosking and R. L. Hudson. Remembered Sets Can Also Play Cards. In *OOPSLA '93 Workshop on Garbage Collection and Memory Management.* Washington, D.C., September 1993.

[4] R. L. Hudson and J. E. B. Moss. Incremental garbage collection for mature objects. In Yves Beakers and Jacques Cohen, editors. Proceeding of International Workshop on Memory Management, volume 637 of Lecture Notes in Computer Science, 1992. Springer-Verlag.

[5] H. Lieberman and C. E. Hewitt. *A Real Time Garbage Collector Based on the Lifetimes of Objects, Communications of the ACM,* 26(6), pages 419–429, 1983.

[6] J. Seligmann and S. Grarup. Incremental mature garbage collection using the train algorithm. In O. Nierstras, editor. *Proceedings of* 1995 *European Conference on Object-Oriented Programming,* Lecture Notes in Computer Science. Springer-Verlag, August 1995.

[7] Patrick Sobalvarro. A lifetime-based garbage collector for Lisp systems on general-purpose computers. Technical Report AITR-1417, MIT, AI Lab, February 1988.

[8] D. Ungar. Generation Scavenging: A Non-disruptive High Performance Storage Reclamation Algorithm. *Proceedings of the ACM Symposium on Practical Software Development Environments,* ACM SIGPLAN Notices Vol. 19, No. 5, May 1984, pp. 157–167.

[9] Paul R Wilson. Uniprocessor garbage collection techniques. In Yves Bekkers and Jacques Cohen, editors. *Proceedings of International Workshop on Memory Management,* volume 637 of Lecture Notes in Computer Science, 1992. Springer-Verlag.

[10] P. R. Wilson and T. G. Moher. A card-making scheme for controlling intergenerational references in generation-based garbage collection on stock hardware. *ACM SIGPLAN Notices,* 24(5):87–92, 1989.

BACKGROUND OF THE INVENTION

In the context of memory management, garbage collection is an important task which identifies and collects memory objects that were previously allocated for a given computer application, and are no longer used thereby. Consider, for example, a continuous (and relatively large) heap (10) (see FIG. 1) and a smaller, so called "root memory module" (12), representative of memory currently in use by one or more computer applications.

All those objects (14) that are directly or indirectly reachable from the root by pointers are "alive" and should not be collected. In contrast thereto, all the objects (16) which have no reference pointers are effectively no longer in use and are therefore regarded as garbage that should be collected. After collection, only active objects are maintained in the heap and memory space that has just been released due to garbage collection, may be allocated for new applications.

The standard approach of scanning the entire heap in order to identify and collect garbage objects is time consuming and therefore an improved scheme called 'generational collection' (5) has been developed, and is now a well accepted solution for reducing pause times induced by garbage collection. Generational garbage collectors rely on the assumption that many objects die young. Under this assumption, it is useful to collect the garbage in the young area more frequently. Young objects that survive several collections are "prompted" to the older generation. Since the young generation is kept small, most collections are fast and do not stall the application for too long.

FIG. 2 illustrates schematically a generational garbage collection scheme, wherein the heap (20) is partitioned into two areas: young and old, (21) and (22), respectively. The young area (21) is scanned more frequently and after garbage objects therein are collected and some of the surviving objects are moved to the old area, objects may be allocated in the young area for new applications. The advantages of the generational garbage collection approach are:

1. Most collections are fast and efficient: they concentrate on the young area where it is expected to find a high percentage of garbage.
2. The heap is frequently collected. Thus the heap is frequently reused.
3. The collector uses a smaller working set since most collections only scan a small part of the heap.
4. The specified advantages (2 and 3) give rise to overall better system behavior with less paging: i.e. the collector traces through fewer pages and the program maintains a small working set since the heap is reused.

Since, only part of the heap is scanned, it is required to identify not only those pointers that reference objects from the root to the young area (e.g. pointer (25), but also inter-generational pointers (e.g. (26), i.e. pointers that originate from objects residing in the old generation and reference objects in the young generation. As will be explained in greater detail below, data structure are known in the literature which assist in rapidly identifying the inter-generational pointers for GC purposes.

In a multi-generation scheme (i.e. the heap is partitioned into more than two generations), typically, when a generation is subject to GC, all the younger generations are also collected. This reduces the bookkeeping for inter-generational pointers, so that only pointers from older to younger generations need to be maintained. Typically, the number of such pointers is relatively small and, thus, generational collections can use a data structure to maintain an (almost) updated list of these inter-generational pointers. Two possible data structures are suggested in the prior art [5], [7] and [8]: card marking and remembered sets. A combination of the two is suggested in [3].

One way to record inter-generational pointers for a given generation is to maintain a remembered set for the generation [5] and [8]. In the remember set of generation g, all locations of the inter-generational pointers that reference objects in generation g are kept. Maintenance of this set is done by the application whenever a pointer is stored, and by the collector when objects are promoted. Variations on this method are discussed in [1] and [9].

Maintaining the remembered set imposes a costly overhead on the application during normal operation seeing that any change of a pointer necessitates insertion and/or deletion of a member in the remembered set. Card marking reduces this cost [7]. Here, the heap is partitioned into cards of equal size, and whenever the application modifies an object in a card, it marks the card as dirty. Marking a card is a very short operation for the user program [2], [7], [10]. Depending on the specific processor, it may be implemented in 3 to 6 instructions. However, the collector performs more work in a card marking system. It must scan all the dirty cards to find the inter-generational pointers, instead of just getting the pointer from the remembered set. Dirty cards are cards that were recently modified by the application some of which contain inter-generational pointers, the latter being scanned repeatedly.

The advantage of combining these two methods is pointed out by Hosking and Moss [3]. After scanning a card once to find all modifications, the relevant inter-generational pointers can be kept in a remembered set and the card need not be scanned again unless it is modified. This keeps the advantage of low overhead on the application, but also increases the collector efficiency, since cards are scanned once and not repeatedly; their dirty flag is cleared; and only dirty (modified) cards are scanned.

The utilization of conventional remembered set and card marking data structures poses a significant overhead in a multi-generational scheme. Thus, suppose that a few young generations are collected, all dirty cards are scanned, and the remembered set of each collected generation is updated. The dilemma is whether all the remembered sets, including remembered sets of generations that were not collected should be updated. If in the affirmative, longer delays are caused, while collecting the younger generations. (Recall that updating the remembered set means removing all entries that have become relevant plus adding entries for new inter-generational pointers). On the other hand, if not all the remembered sets are updated, then the mark of the card cannot be cleared, since it has not been scanned for older generations. The inevitable consequence of failing to clear the marks is that the card is unnecessarily scanned again and again during future collections of the young generations.

There is accordingly a need in the art to substantially reduce or overcome the inherent limitations of remembered set and card markings data structures, in multi-generational GC applications.

SUMMARY OF THE INVENTION

According to one aspect of the invention, for each card, the number of the youngest generation for which this card has not been scanned is kept. For example, if a card were scanned for the collection of generations 0, 1, 2 and 3, then the number 4 is written into the corresponding entry in the card table. Whenever a generation which is younger than 4 is collected, the card table indicates that this card need not be scanned. If, on the other hand, a generation which is number 4 or older is modified, then the specified card is scanned, the relevant remembered sets are updated and the entry in the card table is modified to indicate for which generations this card has already been scanned.

It remains to specify what the application has to do when modifying a card. But this operation is not changed. The application has to set the value of the entry in the card table to zero when a card gets "dirty". This means that this card must be scanned for all generations 0 or up, which translates to all generations.

Accordingly, the invention provides for a computer-implemented method for performing garbage collection of memory objects in a memory heap, the method comprising the steps of:

(a) partitioning said heap or a portion thereof into at least three generations; a generation from among said at least three generations constituting oldest generation and being least frequently subject to garbage collection, other generations from among said at least three generations constituting younger generations of which one constitutes a youngest generation most frequently subject to garbage collection;

(b) partitioning said heap or partition thereof into cards;

(c) associating said generations with remembered sets and card markings data structures; said card marking including, for each card, a card scan indication indicative of a youngest one of said generations for which the card has not been scanned;

(d) for every card having a card scan indication value that does not exceed a selected generation:
   i. identifying updated inter-generational pointers that refer to memory objects that reside in said selected generation or younger generations;
   ii. updating the respective remembered set with the identified inter-generational pointers for each identified updated inter-generational pointer; and
   iii. updating the card scan indication of said card to a generation older by one than said selected generation.

Still further, the invention provides for a method for performing garbage collection of memory objects in a memory heap, the method comprising the steps of:

(a) partitioning said heap or portion thereof into at least three generations; a generation from among said at least three generations constituting oldest generation and being least frequently subject to garbage collection, other generations from among said at least three generations constituting younger generations of which one constitutes a youngest generation most frequently subject to garbage collection;

(b) partitioning said heap or portions thereof into cards;

(c) associating said generations with remembered sets and card markings data structures; each card in said card markings includes scan generation related data indicative of generations for which the card has or has not to be scanned;

(d) scanning cards according to said scan generation related data;

(e) in the case of identified updated inter-generational pointers, updating the remembered set with the identified inter-generational pointers; and (f) updating the scan generation related data.

Still further, the invention provides for a system for garbage collection of memory objects in a memory heap; the system comprising a memory heap or portion thereof that is partitioned into at least three generations; a generation from among said at least three generations constituting oldest generation and being least frequently subject to garbage collection, other generations from among said at least three generations being younger generations of which one constitutes a youngest generation most frequently subject to garbage collection; said heap or portion thereof being partitioned into cards; said generations being associated with remembered sets and a card marking data structure; said card marking including for each card, a card scan indication indicative of the youngest generation for which the card has not been scanned;

the system further comprising:

a processor communicating with said memory for scanning the cards having a card scan indication value that does not exceed a selected generation; and for each one of said cards;

(a) identifying updated inter-generational pointers that refers to memory objects that reside in said selected generation or younger generations;

(b) updating the respective remembered set with the identified inter-generational pointers for each identified updated inter-generational pointer; and (c) updating the card scan indication of said card to a generation older by one than said selected generation.

The invention further provides for a system for garbage collection of memory objects in a memory heap; the system comprising a memory heap or a portion thereof that is partitioned into at least three generations; a generation from among said at least three generations constituting oldest generation and being least frequently subject to garbage collection, other generations from among said at least three generations being younger generations one of which constitutes a youngest generation most frequently subject to garbage collection; said heap or portions thereof being partitioned into cards; said generations being associated with remembered sets and card markings data structure; each card in said card markings including scan generation related data indicative of generations for which the card has or has not to be scanned;

the system further comprising:

a processor communicating with said memory for:

scanning the cards according to said scan generation related data; and in response to identifying updated inter-generational pointers;

updating the remember set with the identified inter-generational pointers; and updating the scan generation related data.

Still further, the invention provides for a storage medium associated to processor and accessible by garbage collection application running on said processor, for garbage collection of memory objects; the storage medium includes:

a memory heap or portion thereof that is partitioned into at least three generations; a generation from among said at least three generations constituting oldest generation and being least frequently subject to garbage collection, other generations from among said at least three generations being younger generations and a generation from among said at least three generations, constituting youngest generation, and being most frequently subject to garbage collection; said heap or portion thereof being partitioned into cards; said generations are associated with remembered sets and card markings data structure; said card marking includes, for each card, a card scan indication indicative of the youngest generation for which the card has not been scanned.

The invention further provides for storage medium associated to processor and accessible by garbage collection application running on said processor, for garbage collection of memory objects; the storage medium includes:

a memory heap or portion thereof that is partitioned into at least three generations; a generation from among said at least three generations constituting oldest generation and being least frequently subject to garbage collection, other generations from among said at least three generations being younger generations one of which constitutes a youngest generation most frequently subject to garbage collection; said heap or portions thereof being partitioned into cards; said generations being associated with remembered sets and card markings data structure; each card in said card markings including scan generation related data indicative of generations for which the card has or has not to be scanned.

BRIEF DESCRIPTION OF THE DRAWINGS

For a better understanding, the invention will now be described, by way of non-limiting example only, with reference to the accompanying drawings, in which:

FIG. 4 is a generalized block diagram illustrating operational step of garbage collection application, according to the embodiment of FIGS. 3A–B.

DETAILED DESCRIPTION OF SPECIFIC EMBODIMENTS

Figure 3A:
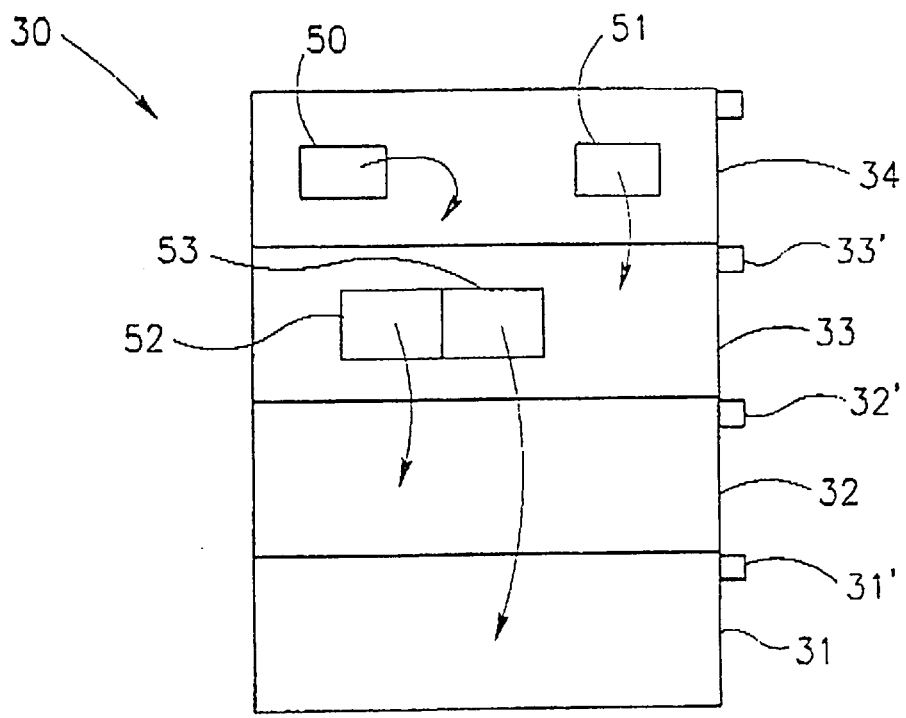
FIGS. 3A–B illustrate schematically a heap memory structure and associated data structure, for use with generational garbage collection application, according to one embodiment of the invention.
Figure 3B:
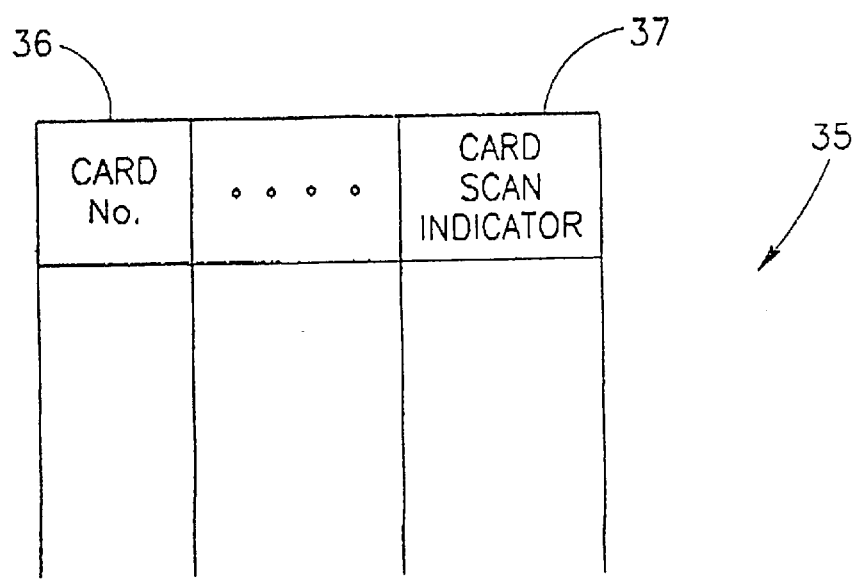

Attention is now directed to FIGS. 3A–B showing a schematic illustration of a heap memory structure and associated data structure, for use with generational garbage collection application, according to one embodiment of the invention.

As shown in FIG. 3A, heap (30) is partitioned into four equally sized generations (31), (32), (33) and (34) of which (31) constitutes the youngest, and (34) constitutes the oldest. Each generation is partitioned into cards, preferably of equal size. However, both the generations and the cards may be of unequal size, if desired. Likewise, the invention does not pose any specific constraint on the order of the generations (e.g. they may be arranged according to one embodiment in consecutive order).

Each generation except for the oldest generation (34), is associated with a remembered set data structure (designated in FIG. 3A as (31'), (32)' and (33)' respectively). The cards are associated with a card marking data table (35) having various fields of which only two are shown: "card number" (36) and "card scan indication" (37). The former simply identifies each card by a unique number and the latter specifies the number of the younger generation for which the card has not been scanned.

Whilst the card marking data structure should of course specify all the cards, for simplicity only four cards entries are presented (50–53). Likewise, for illustrative purposes only four pointers are shown (40 to 43).

Those versed in the art will readily appreciate that the embodiments of FIGS. 3A and 3B are only examples. Thus, for example, the invention is not bound by any specific data structure for representing remembered sets and/or card markings. Accordingly, the card markings table may be constituted by a single one-byte-long field, for example. According to such a scheme, each card has an entry whose index can be calculated easily from the address of the card in the memory, and the one-byte-long contents of the entry specifies the younger generation for which the card has not been scanned.

By way of another example, the card scan indication field that specifies the number of the younger generation for which the card has not been scanned is only one form of presenting scan generation related data that stipulates if the specified card is or is not to be scanned. Another non-limiting variant of presenting scan generation related data associated with a card is to keep for each generation a set of cards that have to be scanned when the generation is collected. According to still another example, the specified data is held in encoded form.

The operation of garbage collection according to one embodiment of the invention will now be described, with reference also to FIG. 4. The operational steps of FIG. 4 forming part of a garbage collection application and a user application, are executed on a processor. The processor may be any device (e.g. conventional personal computer) or network of devices capable of running applications, all of which are known per se.

The first steps of FIG. 4 (designated collectively as (60), constitute initialization steps which are performed normally once. By this particular embodiment, step (60) includes "partition heap into generations", "partition generations into cards"; "associating said generations with remembered set and card marking data structure", and "select generation to collection". There follow operational steps designated collectively as (61).

The operation of the garbage collection will now be described with reference also to FIGS. 3A and 3B.

Consider, for example, that the second generation (32) is currently scanned. As explained above, scanning the second generation, preferably entails scanning also all the younger generations and by this particular example the youngest generation (31).

As a matter of default, the card scan indication value of all the cards is initially set to 0, indicating that all cards need to be scanned.

Cards (50) and (51) do not have inter-generational pointers that point to the currently scanned second generation and therefore the remembered set need not be updated. The card scan indications of cards (50) and (51) are updated to 3 indicating that the cards will have to be rescanned when generation (33) (or older) will e scanned.

Card (52) has an inter-generational pointer that refers to the currently scanned generation and the remembered set data structure (32') is updated accordingly. Generally speaking, updating remembered sets encompasses insertion and/or deletion of information that pertains to pointers that refer (or used to refer before) to the generation for which the remembered set is updated. As before, the card scan indication value of card (52) is updated to 3 indicating that the cares will have to be rescanned when generation (33) (or older) will be scanned. Lastly, card (53) has a pointer that refers to a memory object in the first generation (31). Since scanning the second generation encompasses preferably, although not necessarily, scanning also all the younger generations, the inter-generational pointer that originates from card (53) is updated in the remembered set (31'). Furthermore, the card scan indication value of card (53) is updated to 3 indicating that the cards will have to be rescanned when generation (33) (or older) will be scanned.

Those versed in the art will readily appreciate that modifying the card scan indication is a relatively short operation for the collector and therefore the computational overhead imposed by updating the card scan indication is very low.

Any card that is modified by the user application, (i.e. there is change in pointer originating from the specified card) necessitates updating of the card scan indication to a value (e.g. 0) which signifies that the modified card should be scanned for all generations. As explained above, the specified update imposes very low computational overhead.

The garbage collection may now be realized in known manner by checking the remembered set.

Figure 1:
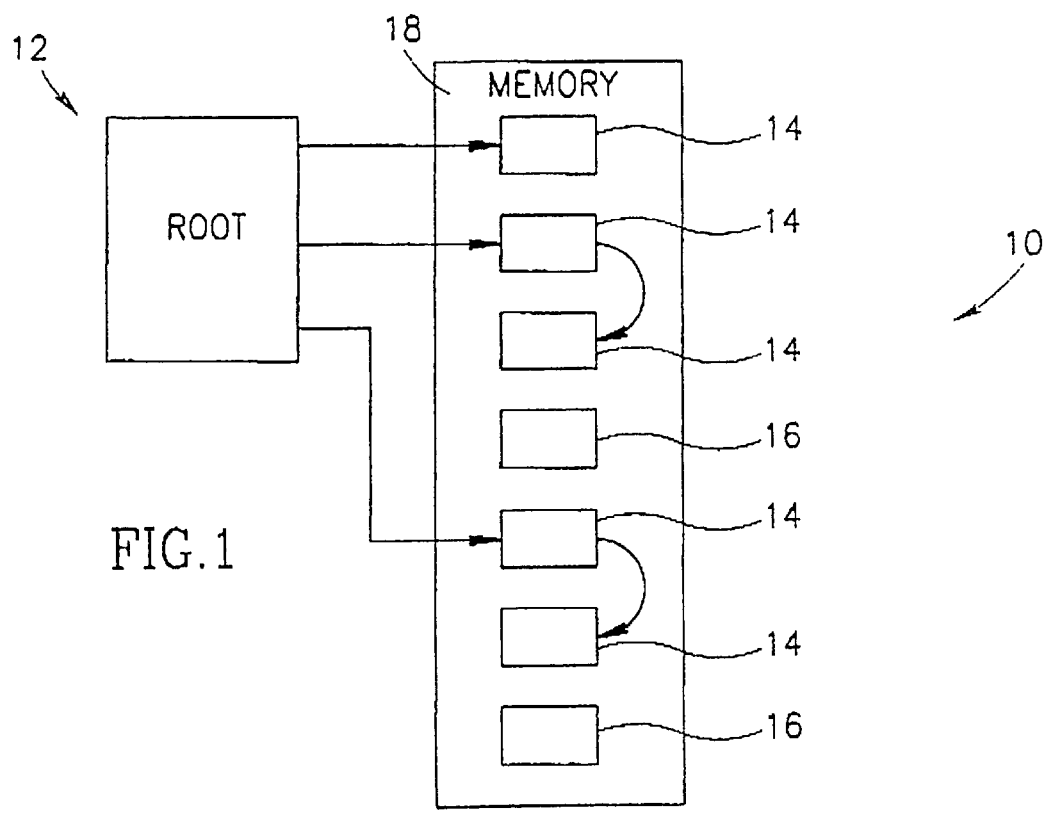
FIG. 1 illustrates schematically a heap memory structure for use with a naive garbage collection application
Figure 2:
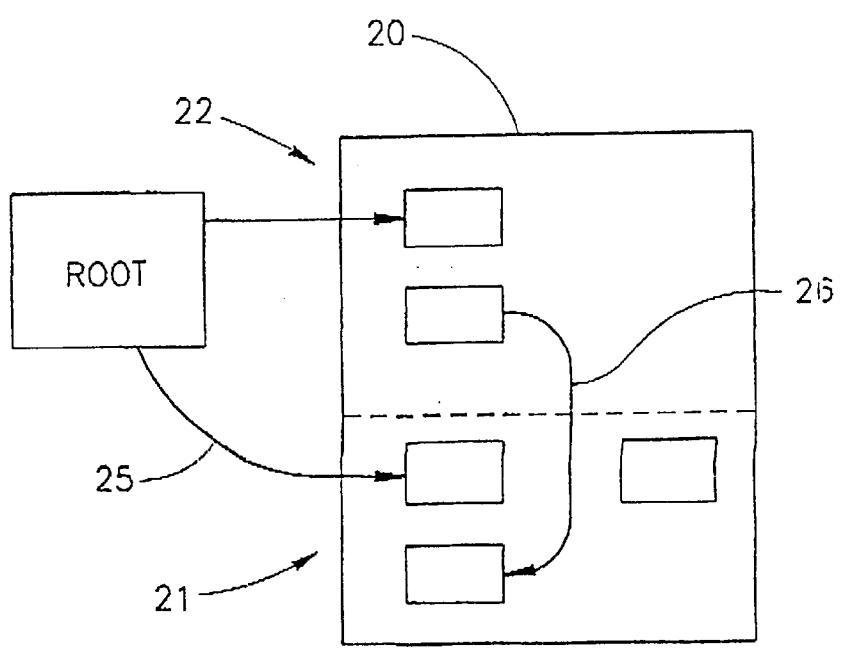
FIG. 2 illustrates schematically a heap memory structure for use with generational garbage collection application according to the prior art.

If desired, the "old" area of the heap (see e.g. [(18) in FIG. 1], may be subject to known per se garbage collection techniques, e.g. the one based on the so called "train" algorithm. The "Train" algorithm is disclosed by J. Seligmann and S. Grarup [6] the contents of which are incorporated herein by reference. Alternatively, the technique disclosed in co-pending U.S. patent application Ser. No. 09/139,754 assigned to the present Applicant and filed simultaneously to the present application, may be employed. The contents of U.S. patent application Ser. No. 09/139,754 are incorporated herein by reference.

In the following claims, numbers, alphabetic characters and Roman symbols are presented for convenience of explanation only and should by no means be regarded as implying only specific order.

The invention has been described with a certain degree of particularity, but those versed in the art will readily appreciate that various modifications and alterations may be carried out without departing from the scope and spirit of the following claims.

What is claimed is:

1. A computer-implemented method for performing garbage collection of memory objects in a memory heap, the method comprising the steps of:
    (a) partitioning said heap or a portion thereof into at least three generations; a generation from among said at least three generations constituting oldest generation and being least frequently subject to garbage collection, other generations from among said at least three generations constituting younger generations of which one constitutes a youngest generation most frequently subject to garbage collection;
    (b) partitioning said heap or partition thereof into cards;
    (c) associating said generations with remembered sets and card markings data structures; said card marking including, for each card, a card scan indication indicative of a youngest one of said generations for which the card has not been scanned;
    (d) for every card having a card scan indication value that does not exceed a selected generation;
        i. identifying updated inter-generational pointers that refer to memory objects that reside in said selected generation or younger generations;
        ii. updating the respective remembered set with the identified inter-generational pointers for each identified updated inter-generational pointer; and
        iii. updating the card scan indication of said card to a generation older by one than said selected generation.

2. The method of claim 1, further comprising the steps of:
    (e) for each card that is modified, updating the respective card scan indication value in the card markings data structure to indicate that all of said at least three generations have not been scanned in respect of said modified card; and (f) applying garbage collection to memory objects according to said remembered set.

3. A method for performing garbage collection of memory objects in a memory heap, the method comprising the steps of:
(a) partitioning said heap or portion thereof into at least three generations; a generation from among said at least three generations constituting oldest generation and being least frequently subject to garbage collection, other generations from among said at least three generations constituting younger generations of which one constitutes a youngest generation most frequently subject to garbage collection;
(b) partitioning said heap or portions thereof into cards;
(c) associating said generations with remembered sets and card markings data structure; each card in said card markings includes scan generation related data indicative of generations for which the card has or has not to be scanned;
(d) scanning cards according to said scan generation related data;
(e) in the case of identified updated inter-generational ppointers, updating the remembered set with the identified inter-generational pointers; and
(f) updating the scan generation related data.

4. The method of claim 3, further comprising the steps of:
(g) for each card that is modified, updating the scan generation related data to indicate that all of said at least three generations have not been scanned in respect of said modified card; and
(h) applying garbage collection to memory objects according to said remembered set.

5. A system for garbage collection of memory objects in a memory heap; the system comprising a memory heap or portion thereof that is partitioned into at least three generations; a generation from among said at least three generations constituting oldest generation and being least frequently subject to garbage collection, other generations from among said at least three generations being younger generations of which one constitutes a youngest generation most frequently subject to garbage collection; said heap or portion thereof being partitioned into cards; said generations being associated with remembered sets and a card markings data structure; said card marking including for each card, a card scan indication indicative of the youngest generation for which the card has not been scanned;
the system further comprising:
a processor communicating with said memory for scanning the cards having a card scan indication value that does not exceed a selected generation; and for each one of said cards:
(a) identifying updated inter-generational pointers that refer to memory objects that reside in said selected generation or younger generations;
(b) updating the respective remembered set with the identified inter-generational pointers for each identified updated inter-generational pointer; and
(c) updating the card scan indication of said card to a generation older by one than said selected generation.

6. The system according to claim 5, wherein for each card that is modified, the processor:
(a) updates the respective card scan indication value in the card markings data structure to indicate that all of said at least three generations have not been scanned in respect of said modified card; and (b) applies garbage collection to memory objects according to said remembered set.

7. A system for garbage collection of memory objects in a memory heap; the system comprising a memory heap or a portion thereof that is partitioned into at least three generations; a generation from among said at least three generations constituting oldest generation and being least frequently subject to garbage collection, other generations from among said at least three generations being younger generations one of which constitutes a youngest generation most frequently subject to garbage collection; said heap or portions thereof being partitioned into cards; said generations being associated with remembered sets and card markings data structure; each card in said card markings including scan generation related data indicative of generations for which the card has or has not to be scanned;
the system further comprising:
a processor communicating with said memory for:
scanning the cards according to said scan generation related data; and in response to identifying updated inter-generational pointers;
updating the remember set with the identified inter-generational pointers; and
updating the scan generation related data.

8. The system according to claim 7, wherein for each card that is modified the processor:
(a) updates the scan generation related data to indicate that all said at least three generations have not been scanned in respect of said updated card; and
(b) applies garbage collection according to said remembered set.

9. Storage medium associated to processor and accessible by garbage collection application running on said processor, for garbage collection of memory objects; the storage medium includes:
a memory heap or portion thereof that is partitioned into at least three generations; a generation from among said at least three generations constituting oldest generation and being least frequently subject to garbage collection, other generations from among said at least three generations being younger generations and a generation from among said at least three generations, constituting youngest generation, and being most frequently subject to garbage collection; said heap or portion thereof being partitioned into cards; said generations are associated with remembered sets and card markings data structure; said card marking includes, for each card, a card scan indication indicative of the youngest generation for which the card has not been scanned.

10. Storage medium associated to processor and accessible by garbage collection application running on said processor, for garbage collection of memory objects; the storage medium includes:
a memory heap or portion thereof that is partitioned into at least three generations; a generation from among said at least three generations constituting oldest generation and being least frequently subject to garbage collection, other generations from among said at least three generations being younger generations one of which constitutes a youngest generation most frequently subject to garbage collection; said heap or portions thereof being partitioned into cards; said generations being associated with remembered sets and card markings data structure; each card in said card markings including scan generation related data indicative of generations for which the card has or has not to be scanned.

11. The method according to claim 2; wherein said heap is further partitioned into an old area; the method further comprising the step of collecting garbage memory objects also from the old area of the heap.

12. The method of claim 11, wherein said garbage collection is effected according to the train algorithm.

13. The method according to claim 4, where said heap is further partitioned into an old area; the method further comprising the step of collecting garbage memory objects also from the old area of the heap.

14. The method according to claim 13, wherein said garbage collection is effected according to the train algorithm.

15. The method according to claim 6, wherein said heap is further partitioned into an old area; and the processor is further capable of collecting garbage memory objects also from the old area of the heap.

16. The method according to claim 15, wherein said garbage collection is effected according to the train algorithm.

17. The method according to claim 8, wherein said heap is further partitioned into an old area; and the processor is further capable of collecting garbage memory objects also from the old area of the heap.

18. The method according to claim 17, wherein said garbage collection is effected according to the train algorithm.

\* \* \* \* \*